United States Patent [19]

Henderson et al.

[11] Patent Number: 4,795,910
[45] Date of Patent: Jan. 3, 1989

[54] RADIATION-DETECTION/SCINTILLATOR COMPOSITE AND METHOD OF MANUFACTURE

[75] Inventors: Timothy M. Henderson; Glenn F. Knoll, both of Ann Arbor, Mich.

[73] Assignee: KMS Fusion, Inc., Ann Arbor, Mich.

[21] Appl. No.: 923,021

[22] Filed: Oct. 24, 1986

[51] Int. Cl.$^4$ .................... G01N 3/06; G01N 1/203
[52] U.S. Cl. ......................... 250/483.1; 250/368; 250/390
[58] Field of Search ............... 250/487.1, 390 J, 486.1, 250/483.1, 367, 368; 376/153, 155

[56] References Cited

U.S. PATENT DOCUMENTS

| | | | |
|---|---|---|---|
| 3,023,313 | 2/1962 | De La Mater et al. | 250/487.1 |
| 3,573,220 | 4/1971 | Benson | 250/390 J |
| 3,885,159 | 5/1975 | John et al. | 250/390 J |
| 4,023,039 | 5/1977 | Galves et al. | 250/486.1 |
| 4,432,933 | 2/1984 | Teitel et al. | 376/152 |
| 4,637,898 | 1/1987 | DeBoer et al. | 250/483.1 |

OTHER PUBLICATIONS

Sun et al, "Scintillation Counters", *Nucleonics*, Jul., 1956, pp. 46–49.

*Primary Examiner*—Carolyn E. Fields
*Assistant Examiner*—John A. Miller
*Attorney, Agent, or Firm*—Barnes, Kisselle, Raisch, Choate, Whittemore & Hulbert

[57] ABSTRACT

A radiation-detection/scintillation composite in which a multiplicity of particulate glass carriers embodying radiation target nuclei are embedded within a matrix of solid scintillation plastic composition. The glass target-containing carriers have an index of refraction which closely matches that of the scintillation plastic. In one embodiment of the invention, the carriers comprise hollow spherical micro-size shells containing He-3 gas detection nuclei under pressure. In another embodiment, Li, B or Pb or other heavy element detection nuclei are contained within the composition of the glass carriers.

34 Claims, 1 Drawing Sheet

RADIATION-DETECTION/SCINTILLATOR COMPOSITE AND METHOD OF MANUFACTURE

The invention in this application was not made with Government support but was the subject of Government Contract No. DE-ACO2-85ER80294 and the Government has certain rights in the invention.

The present invention is directed to radiation detectors, and more particularly to scintillators responsive to absorption of radiation for release of visible light.

BACKGROUND OF THE INVENTION

Detectors of the subject type find wide application for measuring neutron, gamma and other forms of radiation. Gaseous HE-3, for example, has been widely employed in detection and spectroscopy of neutron radiation. The neutron-induced reaction $$_2He^3 + _0n^1 \rightarrow _1H^1 + _1H^3 \quad (1)$$

has a positive Q-value of 765 keV, resulting in production of an energetic proton and triton for each interacting neutron.

Typical detectors comprise an ionization or proportional counter filled with He-3 gas. To enhance efficiency, such detectors are operated at pressures of several atmospheres to increase the density of helium target nuclei. Maximum pressure, however, is limited to about ten atmospheres because of physical and mechanical problems. For example, construction of seals and electrical feedthroughs becomes difficult and unreliable at higher pressures. Moreover, high gas pressures slow ion and electron migration times, and therefore decrease timing precision. Conventional detectors have timing resolutions typically on the order of hundreds of nanoseconds, which is insufficient for applications which require timing precision.

Another problem with conventional He-3 detectors is the so-called "wall effect". At pressures obtainable with conventional designs, the travel distance or range of reaction products is not small compared with the physical dimensions of the detectors (typically greater than or equal to about 5 cm). Therefore, a significant fraction of events results in only partial energy loss within the detector gas, and a corresponding reduction in observed output pulse amplitude. A heavier gas component, such as argon or krypton, may be added to reduce the range of reactor products, but at the expense of detection efficiency.

It has been proposed to intermix a powdered radiation detector with a separate solid phase scintillation medium, such as a scintillating polymer. Equation (1) is an example of a gaseous detection medium. Other detection materials having lithium and boron target nuclei exhibit the following reactions with thermal neutrons:

$$_5B^{10} + _0n^1 \rightarrow _3Li^7 + _2\alpha^4 \quad (2)$$

$$_3Li^6 + _0n^1 \rightarrow _1H^3 + _2\alpha^4 \quad (3)$$

The thermal neutron cross section for boron is 3800 barns with a Q-value of 2.3 MeV, and that of lithium is 1000 barns at a Q-value of 4.78 MeV. The more energetic alpha particle of the boron reaction and triton from the lithium reaction are the principal sources of light produced in the scintillation medium. However, the proposed intermixtures do not exhibit desired efficiency. Specifically, failure of the index of refraction of the detection powder to approximate or match that of the scintillation medium increases light scatter, thereby increasing light absorption and reducing output efficiency of the scintillation medium. Doping of the scintillation plastic, whereby the target nuclei are chemically bonded to the plastic, generally degrades scintillation efficiency.

OBJECTS AND SUMMARY OF THE INVENTION

It is therefore a general object of the present invention to provide a radiation detector which exhibits enhanced efficiency per unit volume and fast response time, which eliminates sealing and handling problems characteristic of gas detectors of the prior art, and which may be readily provided in any desired geometry or configuration. Another object of the invention is to provide an economical method of manufacturing such a detector.

In accordance with the present invention, a radiation-detection/scintillation composite is formed by suspending a multiplicity of particulate carriers containing radiation target nuclei as separate phases in a solid plastic matrix or a liquid scintillation organic composition. In accordance with a critical feature of the present invention, the target-containing carriers have an index of refraction which closely or substantially matches that of the scintillation medium. Thus, losses due to light scattering are greatly reduced. In the preferred embodiments of the invention, the target-containing carriers are of glass composition, and more preferably are of spherical geometry for enhanced wetting by the plastic or liquid scintillator during the formation process.

In one embodiment of the invention, the carriers comprise hollow spherical glass shells internally containing He-3 target nuclei in gas phase. The shells possess a preferred outside diameter of 100 microns, and contain the He-3 gas at a pressure of 100 atmospheres. For enhanced gas containment at room temperatures, the shell composition preferably contains non-glass formers in concentrations greater than thirty mole percent. A prototype detector constructed in accordance with this aspect of the invention achieved a detection efficiency per unit volume equivalent to that of a conventional He-3 proportional counter filled to 50 atm., but without consequent sealing and handling problems. Furthermore, the signal pulses possessed a rise time of less than two nanoseconds, at least two orders of magnitude faster than with conventional He-3 proportional counters.

In another embodiment of the invention, the carriers comprise solid glass beads containing the radiation target nuclei as part of the glass composition. Preferably, the target nuclei are selected from the group consisting of lithium and boron for neutron detectors, lead or other heavy elements for gamma-ray detectors, and mixtures thereof.

BRIEF DESCRIPTION OF THE DRAWING

The invention, together with additional objects, features and advantages thereof, will be best understood from the following description, the appended claims and the accompanying drawing in which:

DETAILED DESCRIPTION OF PREFERRED EMBODIMENTS

Figure 1:
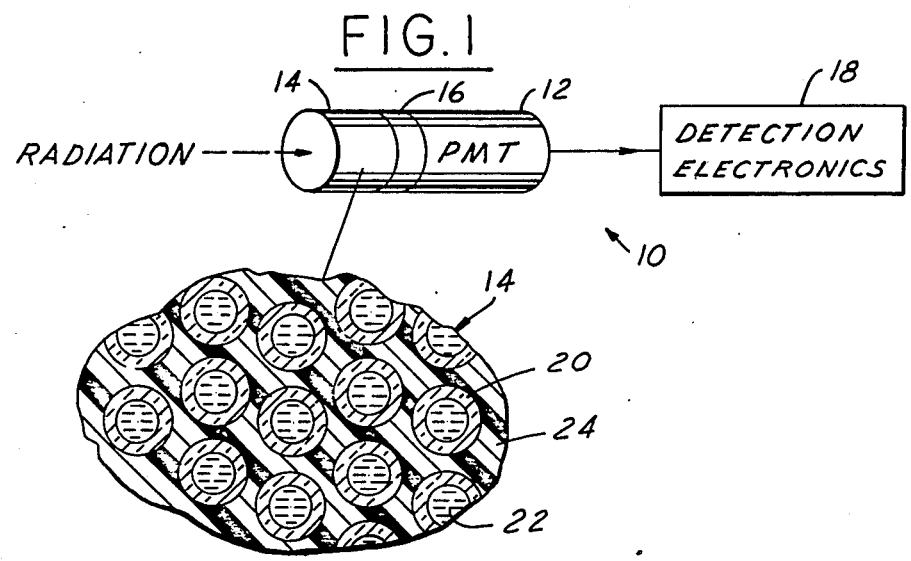
FIG. 1 is a schematic diagram of a radiation detector which includes a radiation-detection/scintillation composite in accordance with a first embodiment of the invention.

FIG. 1 illustrates a radiation detector system 10 embodying the subject matter of the present invention as comprising a photomultiplier tube or PMT 12 having a detection/scintillation composite 14 affixed thereto by an interface layer 16 of optical grease or the like. In many applications, photodiodes can be used in place of photomultipliers. It is to be understood in this discussion that "photomultiplier" and "photodiode" can be used interchangeably. PMT 12 may be of any suitable conventional construction responsive to incident light for generating electrical signals to detection electronics 18. Composite 14, in accordance with the invention, is responsive to incident radiation from a test source (not shown) for supplying light to PMT 12. The generally cylindrical construction of PMT 12 and composite 14 illustrated in FIG. 1 is exemplary. Indeed, an important feature of composite 14 in accordance with the invention is that it can be formed to match the geometry of any PMT 12. However, cylindrical PMT's with diameter in the range of ½ inch to three inches are widely available and may be economically combined with composite 14 of like diameter in accordance with the invention.

Composite 14, in the embodiment of FIG. 1, comprises a multiplicity of micro-sized hollow spherical shells 20 internally containing target nuclei 22 in gas phase and embedded or suspended within a surrounding matrix 24 of scintillation plastic. Shells 20 are preferably of glass composition, having an index of refraction (about 1.5) which closely matches that of a number of conventional scintillation plastics. Shells 20 may be formed by any suitable technique, such by directing glass frit through a torch, dropping glass droplets through a tower furnace, or dropping metal-organic gel particles through a tower furnace. The last technique is preferred, with the basic technology being disclosed in U.S. Pat. Nos. 4,017,290 and 4,021,253, and significant refinements being taught in U.S. Pat. Nos. 4,336,338 and 4,340,407.

Gas 22 is placed in shells 20 prior to encapsulation of the shells within matrix 24. This is preferably accomplished in accordance with the technique disclosed in U.S. Pat. No. 4,432,933. Briefly stated, this technique contemplates placement of a quantity of preformed shells in a target nuclei gaseous atmosphere at the desired fill pressure and at an elevated temperature less than the softening temperature of the shell material, for a period of time sufficient to permit permeation of the gaseous target nuclei through the shell walls and into the hollow shell interior. Temperatures in the range of 300° to 400° C. are typical for glass shells. Pressure depends upon desired fill pressure. Pressure increase is preferably performed at stepped increments to minimize shell breakage. The temperature is thereafter decreased effectively to entrap the target nuclei within the shell. Other methods of charging the shells may be employed. It is also within the scope of the invention to charge the shells in or as part of the shell-forming operation—i.e., to form the shells so as to encapsulate the target nuclei during the formation process.

Glass shell composition is selected primarily on the basis of permeation characteristics at elevated and reduced (room) temperatures, chemical durability and for sufficient strength to resist rupture during and after the charging process. Shell geometry (diameter and wall thickness) is selected primarily on the bases of strength. It is desirable, of course, to obtain rapid permeation at elevated temperature to reduce process time, but slow permeation at reduced (room) temperature to increase product life. Permeation characteristics of glasses at elevated and room temperatures are documented in various texts, handbooks and product literature. In general, resistance to permeation at reduced (room) temperature is obtained by inclusion of non-glass formers, such as oxides of Na, Mg or Ca, in the silicate glass matrix. However, non-glass formers may also reduce glass strength and chemical durability. To achieve good permeation characteristics while maintaining glass strength, it is presently preferred that non-glass formers should be in the range of 30 to 40 oxide-equivalent mole percent. A presently preferred glass composition is socalled Corning 1723 glass, which has a composition (mole percent) of $SiO_2(70)$, $CaO(13)$, $B_2O_3(5)$ and $Al_2O_3(12)$. This glass thus includes 34.15% non-glass formers. This glass has a helium permeation rate of $2.98 \times 10^{-18}$ mol . m/m$^2$ . sec . Pa at 300° C., and a permeation rate of $1.34 \times 10^{-22}$ mol . m/m$^2$ . sec . Pa at room temperature. Given desired final shell composition and geometry, starting metal-organic gel composition and furnace parameters can be estimated and empirically adjusted following the teachings of Belanger et al, "Glass Shell Preparation", J. Vac. Sci. Tech., A3 (3) (May/June 1985) pp. 1270–1273.

Gas pressure within shells 20 is a function of desired detection efficiency and shell strength. Shell strength, in turn, is a function of shell composition, as previously noted, and shell geometry. As presently envisioned, shell diameter should be in the range of 50 to 500 microns. The lower size limit is selected to minimize light scattering within the composite. The upper limit is selected to keep the shell wall as thin as possible. (To maintain the same internal pressure, shell wall thickness must increase linearly with diameter.) Thin walls are desirable because energetic particles passing therethrough will lose less energy before entering the scintillation medium. Large-diameter shells also undesirably produce higher energy losses of the radiation products as a result of loss of particle energy in collision with other He-3 molecules. Within this diameter range, He-3 pressures in the range of 50 to 200 atmospheres, and most particularly about 100 atm., are preferred. Lower pressures reduce detection efficiency, while higher pressures tax glass strength. For a contained gas pressure of substantially 100 atm., shell diameters in the range of 80 to 150 microns, and specifically 100 microns, are particularly preferred. Shell wall thickness in the range of 0.4 to 1.0 microns, particularly about 0.5 microns, is preferred. Below 0.4 microns, the shells are excessively fragile. Above one micron, excessive particle energy, specifically that of the protons, is absorbed in the shell wall. Using Corning 1723 glass composition previously discussed, a $50 \times 0.5$ micron (diameter $\times$ wall thickness) shell will retain 80% of its fill pressure for 5.9 months, and a $200 \times 0.5$ micron shell will retain 80% of its fill pressure for 23 months.

Following formation and charging or filling of shells 20, the shells are embedded in matrix 24 of plastic or similar scintillation material. In general, plastic scintillation materials of the subject type are characterized in that they consist of an organic scintillation disclosed in a solvent which is subsequently polymerized to form the equivalent of a solid solution. The most commercially available systems have a solute consisting of p-terphenyl (TP) 2,5-diphenyloxiazole (PPO) or 2-phenyl-5-(5-biphenylyl)1, 3, 4-oxadiazole (PBD), and a solvent consisting of polyvinylbenzene (polystyrene) and polyvinyltoluene. Type NE-102 offered by Nuclear Enterprises, Inc. is presently preferred. Other suitable commercially available plastics include the remainder of the NE product from National Enterprises, and the ND series from National Diagnostics, Inc. Suitable liquid scintillators are also commercially available from these two sources. Indices of refraction for visible light range from 1.49 to 1.581 for plastic scintillators, and from 1.38 to 1.52 for liquid scintillators.

In general, composite 14 is formed by preparing a gel slurry of pre-formed and pre-charged shells 20, the scintillation plastic prepolymer, a suitable catalyst and a solvent (a vinyltoluene monomer in the case of NE-102), and placing the slurry in a suitable mold to cure at the manufacturer's recommended temperatures (typically 40° C. to 100° C.) for periods ranging from 3 to 20 days. The geometry of the mold, of course, corresponds to the geometry of the PMT with which the composite is to be used. Volumetric ratio of shells to polymer depends upon respective efficiencies. Close packing of the shells would yield a 65% shell volumepercent. A ratio of up to 50% shells, by volume, is readily achievable.

Figure 2:
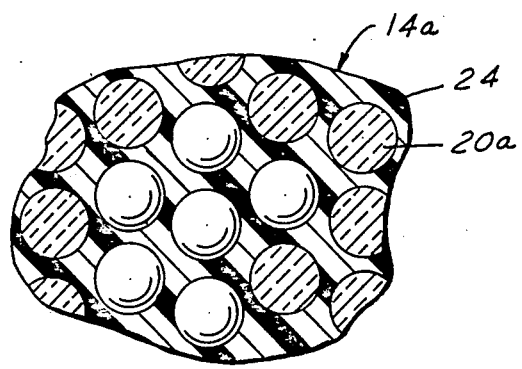
FIG. 2 is a schematic diagram which illustrates a second embodiment of the invention.

FIG. 2 illustrates a modified composite 14a in accordance with a second embodiment of the invention. In composite 14a, the radiation target nuclei are contained within the matrix of a multiplicity of glass particles 20a. Preferably, the target nuclei are selected from the group consisting of B and Li for neutron detection, and Pb or a similar heavy element (such as Ta, W, Gd, Re, Ir, Pt, Au, Hg, Tl, Bi and U) for gamma-ray detection. The target nuclei preferably form part of the glass composition—i.e., are included among the composition glass components. Maximum glass particle size depends upon the range of energetic nuclear particles emitted. Relatively low energy (1.46 MeV) of the B-emitted alpha particle limits glass particles 20a to about three microns in size. The more energetic triton (2.73 MeV) of the Li reaction permits particle sizes up to 30 microns. Maximum concentrations of lithium and boron at 30 to 40 mole percent respectively are envisioned.

When applied as a gamma ray detector, the gamma ray photons interact with the heavy elements in the target to produce fast electrons. The fast electrons from gamma ray absorption by the heavy elements permit glass particle diameters on the order of tens of microns. Lead concentrations of up to 15 mole percent are envisioned. Although any geometry of glass particles 20a may be employed, uniform geometries such as fibers and, more particularly, spheres are preferable for enhanced wetting by the plastic. Particles 20a, including spherical particles or beads, may be formed by any suitable technique, including droplet generation in the case of beads or crushing and sizing frit from pre-formed glass for non-uniform geometries.

As between the embodiments of FIGS. 1 and 2, He-3 detection gas (FIG. 1) exhibits a higher effective cross section to thermal neutrons (5330 barns, versus 3840 for B and 940 for Li), and thus requires fewer target nuclei for the same detection efficiency. On the other hand, the embodiment of FIG. 2 eliminates a gas/glass interface at the shell ID, and thus produces less scattering. Furthermore, more target nuclei can be incorporated into the composite. Moreover, more energetic particles of reaction are produced, which generate more light in reaction with plastic. Furthermore, the energetic reaction products of the boron and lithium radiation absorption are less easily absorbed in glass, thus potentially generating more light in the scintillation medium permitting larger particle sizes. The embodiment of FIG. 2 is also less expensive to manufacture and has an infinite shell life.

The invention claimed is:

1. A radiation-detection/scintillation composite comprising a scintillation matrix responsive to absorption of energetic particles for release of light energy, and a multiplicity of particulate carriers suspended as a separate solid phase within said matrix and having an index of refraction to light energy which closely matches that of said matrix, said carriers containing target nuclei responsive to absorption of radiation for release of energetic particles.

2. The composite set forth in claim 1 wherein said particulate carriers are of glass composition.

3. The composite set forth in claim 2 wherein said particulate carriers are of spherical geometry.

4. The composite set forth in claim 3 wherein said particulate carriers have an outside diameter in the range of one to 500 microns.

5. The composite set forth in claim 3 wherein said particulate carries form up to 65% of said composite by volume.

6. The composite set forth in claim 3 wherein said particulate carriers comprise hollow spherical shells of glass composition, said target nuclei being contained within said shells in gas phase at elevated pressure.

7. The composite set forth in claim 6 wherein said target nuclei comprise He-3.

8. The composite set forth in claim 7 wherein said shells have an outside diameter in the range of 50 to 500 microns.

9. The composite set forth in claim 8 wherein said shells have a outside diameter in the range of 80 to 150 microns.

10. The composite set forth in claim 9 wherein said shells have a wall thickness in the range of 0.4 to 1 micron.

11. The composite set forth in claim 10 wherein said shells have a wall thickness of substantially 0.5 microns.

12. The composite set forth in claim 10 wherein said shells have an outside diameter of substantially 100 microns.

13. The composite set forth in claim 9 wherein said gas-phase He-3 is contained within said shells at a pressure in the range of 50 to 200 atmospheres.

14. The composite set forth in claim 13 wherein said gas-phase He-3 is contained within said shells at a pressure of substantially 100 atmospheres.

15. The composite set forth in claim 8 wherein said glass shells are of composition which contains at least 30 mole percent non-glass formers.

16. The composite set forth in claim 15 wherein said shells contain said non-glass formers in the range of 30 to 40 mole percent.

17. The composite set forth in claim 2 wherein particulate carriers comprise solid particles of glass composition, said target nuclei being contained within said particles.

18. The composite set forth in claim 17 wherein said target nuclei form part of the chemical glass composition of said particles.

19. The composite set forth in claim 18 wherein said target nuclei are selected from the group consisting of Li, B and mixtures thereof for neutron detection, and of Pb, Ta, W, Gd, Re, Ir, Pt, Au, Hg, Tl, Bi, U and mixtures thereof for gamma-ray detection.

20. The composite set forth in claim 19 wherein said target nuclei comprise Li nuclei contained in glass particles of size up to 30 microns.

21. The composite set forth in claim 20 wherein said Li nuclei are in the amount of up to about 50 mole percent concentration in said particles.

22. The composite set forth in claim 19 wherein said target nuclei comprise B nuclei contained in glass particles of size up to one micron.

23. The composite set forth in claim 22 wherein said B nuclei are in the amount of up to about 50 mole percent concentration in said particles.

24. The composite set forth in claim 19 wherein said target nuclei are selected from the group consisting of Pb, Ta, W, Gd, Re, Ir, Pt, Au, Hg, Tl, Bi and U contained in glass particles of size on the order of tens of microns.

25. The composite set forth in claim 24 wherein said Pb target nuclei are in the amount of up to 15 mole percent concentration in said particles.

26. The composite set forth in claim 18 wherein said particles are of uniform external geometry.

27. The composite set forth in claim 26 wherein said particles comprise solid glass spheres.

28. The composite set forth in claim 2 wherein said matrix comprises a solid scintillation plastic.

29. A radiation detector comprising:
a radiation-detection/scintillation composite including a multiplicity of particulate glass carriers having a predetermined index of refraction and containing target nuclei responsive to absorption of radiation from release of energetic nuclear particles, and a solid-phase scintillation plastic matrix in which said carriers are embedded as a separate solid phase, said plastic matrix being responsive to absorption of energetic nuclear particles for release of light and having an index of refraction to light substantially equal to said predetermined index of refraction, and means responsive to light energy from said composite for providing an electrical signal indicative of radiation incident on said composite.

30. The detector set forth in claim 29 wherein said particulate carriers comprise hollow spherical shells of glass composition, said target nuclei being contained within said shells in gas phase under pressure.

31. The detector set forth in claim 30 wherein said target nuclei comprise He-3.

32. The detector set forth in claim 30 wherein said gas-phase He-3 is contained within said shells at a pressure of substantially 100 atmospheres.

33. The detector set forth in claim 29 wherein said target nuclei are selected from the group consisting of Li, B and mixtures thereof for neutron detection, and of Pb, Ta, W, Gd, Re, Ir, Pt, Au, Hg, Tl, Bi, U and mixtures thereof for gamma-ray detection.

34. A method of making a radiation detector comprising the steps of:
(a) forming a multiplicity of particulate carriers having a predetermined index of refraction and containing target nuclei responsive to absorption of radiation for release of energetic particles,
(b) mixing said particulate carriers in a gel which includes a scintillation pre-polymer responsive to absorption of energetic particles for release of light energy,
(c) solidifying said gel to from a solid matrix having an index of refraction which is substantially equal to that of said particulate carriers and in which said particulate carriers are suspended in separate solid phase.

* * * * *